Figure 1:
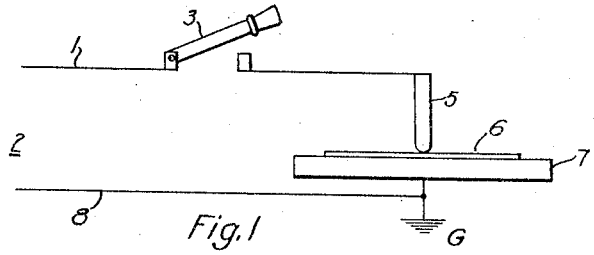

Nov. 15, 1927.

J. F. PETERS

SURGE RECORDER

Filed Dec. 13, 1923

1,649,180

2 Sheets-Sheet 1

WITNESSES:

INVENTOR
John F. Peters
BY
ATTORNEY

Nov. 15, 1927.

J. F. PETERS 1,649,180

SURGE RECORDER

Filed Dec. 13, 1923    2 Sheets-Sheet 2

WITNESSES:

INVENTOR
John F. Peters
BY
ATTORNEY

Patented Nov. 15, 1927.

1,649,180

UNITED STATES PATENT OFFICE.

JOHN F. PETERS, OF PITTSBURGH, PENNSYLVANIA, ASSIGNOR TO WESTINGHOUSE ELECTRIC & MANUFACTURING COMPANY, A CORPORATION OF PENNSYLVANIA.

SURGE RECORDER.

Application filed December 13, 1923. Serial No. 680,569.

My invention relates to electrical measuring instruments and particularly to instruments for recording voltage surges having steep wave fronts.

One object of my invention is to provide a device of the above indicated character that shall be adapted, as a standard adjunct, to commercial electric circuits.

Another object of my invention is to provide a commercial instrument for indicating steep-wave-front electrical surges and that shall be adapted for repeated or continued use.

Another object of my invention is to provide a steep-wave-front surge recorder that shall facilitate the taking of records to a high degree.

Another object of my invention is to provide a standard instrument that shall permit the determination of alternating-current-circuit characteristics that have heretofore been determined only by means of temporary or makeshift apparatus.

A further object of my invention is to provide a steep-wave-front surge recorder that shall be simple and durable in construction, economical to manufacture and effective in its operation.

In electrical circuits, there are phenomena known as waves or surges which occur with changes of voltage. If the rate of voltage change is sufficiently low, a galvanometer may be caused to respond to, and indicate, the surge. However, there is a limit to the rate of voltage change to which any known mechanically movable element, having appreciable inertia, may be made to sensibly record, or indicate, the surge. Such a surge is known as a surge having a steep wave front, in contradistinction to a surge having a relatively low rate of change and to the sustained wave of an alternating-current circuit, irrespective of the amplitude of the latter wave.

Steep-wave-front surges may be caused in electric circuits by various agencies, such as lightning, grounds of exceedingly short duration and other causes, and adversely affect the operation of the circuit in accordance with the steepness, duration, magnitude and direction thereof. It is, therefore, highly desirable that observations of these characteristics be obtainable from a direct-reading instrument that shall be easy to operate, that shall be adapted for the reception of standard or renewal graphic charts and that otherwise shall be adapted as a standard electrical instrument. To the best of my knowledge, no such instrument has heretofore been suggested or, until my invention thereof, been available.

It has been observed that, when flowers of sulphur and red lead are distributed over a charged insulating plate, figures are formed similar to snow flakes and other crystals.

I propose to utilize the above described phenomenon by providing an instrument in which a light-sensitive plate or chart is caused to record steep-wave-front surges in the absence of light. In other words, a light-sensitive plate is placed in a light-proof instrument casing between positive and negative electrodes and subjected to a voltage stress below the luminescent stage. When the positive electrode is above and the negative electrode is beneath, the chart, the figure recorded by a surge is distinctly different in character from that obtained when the positions of the electrodes are reversed.

The instrument of my invention comprises electrodes and a chart-receiving means that are constructed for definite co-operation with a circuit and a particular chart, several of which may be successively placed in the instrument and manipulated automatically or by hand to record one or more surges having steep wave fronts. My invention also comprehends the use of means, for co-operation between the instrument and a circuit, for effecting records by voltage surges that are proportional, but not equal, to the surges in the circuit proper, as well as the provision of means for moving the chart and the electrodes relatively, and other features herein more particularly set forth and claimed.

Figure 2:
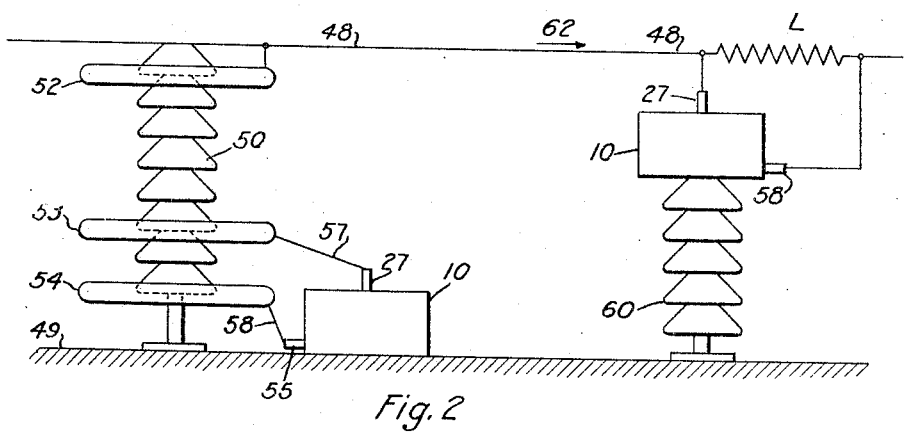
Figure 3:
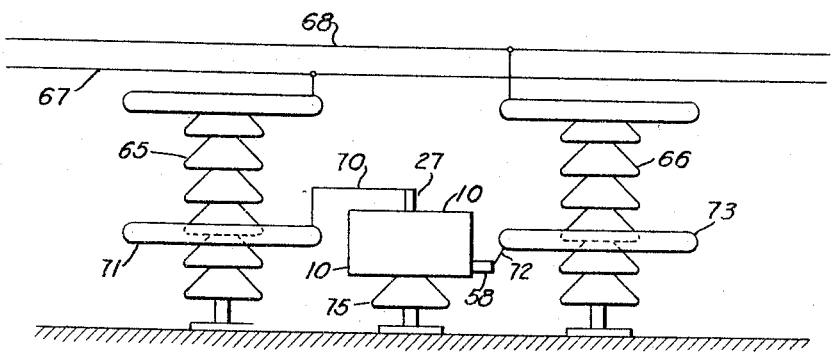
Figure 4:
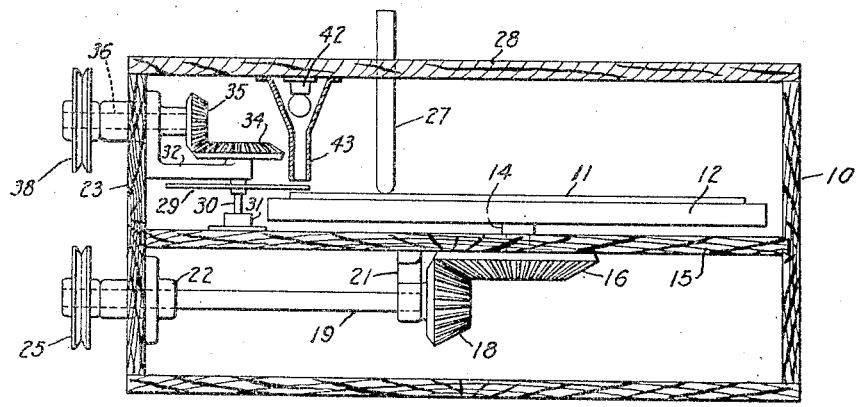
Figure 5:
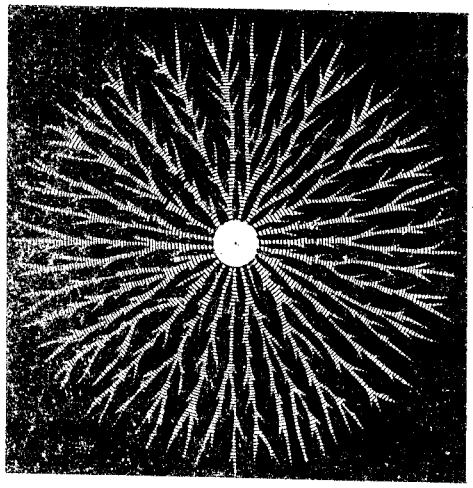
Figure 6:
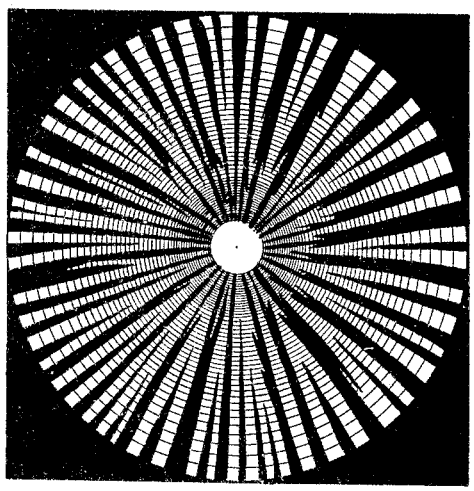
Figure 7:
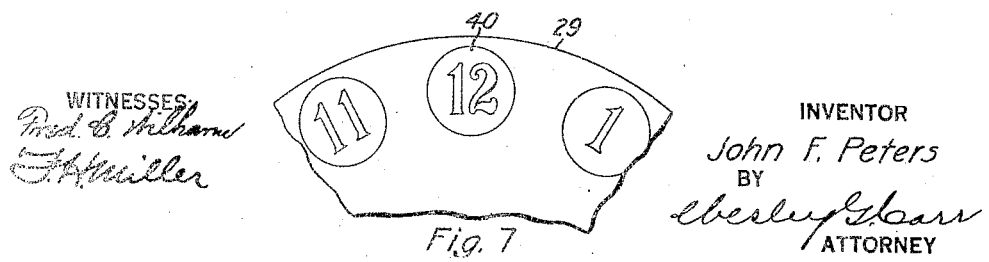

Figure 1 is a diagrammatic view of a device which operates in accordance with one feature of my invention, reduced to its simplest form for facility of explanation, Figs. 2 and 3 are diagrammatic views of different arrangements of the device of my invention, as related to commercial electrical circuits, Fig. 4 is a side sectional view of an instrument embodying my invention, showing certain structural features more in detail, Figs. 5 and 6 are enlarged views of records of the character produced by the instrument of Fig. 4 and Fig. 7 is an enlarged fragmentary plan view of a member of the device shown in Fig. 4.

As shown in Fig. 1, a positive conductor 1, of a circuit 2, is connected, through a switch 3, to an electrode 5 that is disposed with one end in contact with the upper or sensitized surface of a photographic plate 6. The latter is disposed on a conducting plate 7 that is connected to a negative or ground conductor 8 of the circuit 2.

With light excluded from the plate 6 and with the switch 3 closed, a positive steep-wave-front voltage surge, in the circuit 2 from the electrode 5 to the ground plate 7, effects a record on the plate 6, similar to the figure shown in Fig. 5. This record is obtained at a voltage below the corona or arcing stage. When the surge occurs in the opposite or negative direction, that is, from the plate 7 to the electrode 5, the record figure produced on the plate 7 is similar to that shown in Fig. 6. These figures are produced by the application of a voltage for an extremely short interval of time. They do not form instantaneously but grow to their full dimensions, the positive figures being formed in approximately $10^{-8}$ seconds and the negative figures being formed in approximately $10^{-7}$ seconds.

The positive and negative record figures have certain characteristics in common, such as magnitude and intensity, but the forms of the lines are unmistakably different. Thus, the direction of a surge is readily determined.

The diameter of the figure is a measure of the magnitude, the intensity of the figure is an indication of the duration, of the surge.

As embodied in a practical or commercial form of instrument (see Fig. 4), the device comprises a light-proof casing 10 in which the sensitized plate or record chart 11 is mounted on a receiving means, or ground plate 12. The latter is mounted on a shaft 14 that is mounted in a partition 15 of the casing 10 and is provided with a bevel gear wheel 16. The gear wheel 16 engages a bevel pinion 18 on a shaft 19 that is supported in bearings 21 and 22 mounted on the partition 15 and one side wall 23, respectively, of the casing 10. The shaft 19 is provided with means, such as a pulley 25, for suitably driving the plate 12.

An electrode 27 extends through a wall 28 of the casing 10 and is adapted to lightly engage the surface of the plate 11 at a position offset with respect to the shaft 14. In this relation, the chart 11 and the electrode 27 may be moved relatively to effect successive record figures on the chart.

An opaque disc 29 is mounted on a shaft 30 that is journaled in bearings 31 and 32 which are mounted on the partition 10 and the wall 23, respectively. A bevel gear wheel 34, on the shaft 30, engages a bevel pinion 35 secured to a shaft 36 that is journaled in the bearing 32 and is provided with a pulley 38 or other suitable driving means.

As shown in Fig. 7, the disk 29 is provided, adjacent to its perimeter, with a plurality of transparent portions 40 having the hours of the day thereon in opaque figures. These figures may be formed in other ways, as by cutting the disk 29 to form figures similar to stencil figures, so long as they are adapted to mark the chart 11.

A preferred form of device for causing the figures to mark the hours of the day on the chart 11, comprises a lamp 42, the light from which is directed through a member 43. The lamp 42 is adapted to be illuminated momentarily only, when one of the figures of the disk 29 is opposite the member 43.

Thus, with the pulleys 25 and 38 time operated, as by a clock mechanism or a constant-speed motor, and the lamp 42 intermittently flashed, as by the engagement of contact members actuated by the clock mechanism or a constant speed motor (not shown), the chart 11 is rotated to receive successive surge records and to have the hours of the day marked thereon.

As shown in Fig. 2, two instruments are employed, in connection with one of which a positive conductor 48 of a high-potential circuit is supported from a ground 49 by a multi-part insulator 50 that, in effect, constitutes a condenser. Rings 52, 53 and 54, in the electrostatic field of the insulator or condenser 50 serve to uniformly distribute the field. The electrode 27 and a terminal 55 for the ground plate 12 of the instrument 10 are connected, by conductors 57 and 58, to the rings 53 and 54, respectively. By this arrangement, the plate 11 is subject to surges proportional to surges in the conductor 48 but reduced to any desired degree.

The second instrument of Fig. 2 is mounted on a condenser insulator 60, with its corresponding electrode 27 and terminal 58 connected across an inductor L in the conductor 48. With this arrangement, the voltage across the inductor L is proportional to the steepness of the front of the surge, that is, the voltage is equal to $L \frac{di}{dt}$.

When a positive surge occurs in the direction of an arrow 62, the figure recorded on the plate 11 is of the kind illustrated in Fig. 5. When the surge is of negative sign, the recorded figure is similar to that of Fig. 6. Also, with the surge traveling in the opposite direction on the line, the pictures obtained are the reverse of those obtained, as above described. Thus, with an instrument connected across the inductor L, information is obtained on the steepness of the surge front and the direction in which it is traveling. By the use of two instruments, as connected in Fig. 2, indications of the magnitude, duration, sign and direction of a surge are obtained, together with an indication of the steepness of the wave front.

The arrangement illustrated in Fig. 3 is adapted to record surges that occur between two conductors of a polyphase system. In this form, insulator condensers 65 and 66, similar to the insulator condenser 50, are disposed between ground and conductors 67 and 68, respectively. The electrode 27 is connected, by a conductor 70, to a ring 71 on the insulator 65, and the terminal 58 is connected, by a conductor 72, to a ring 73 on the insulator 66. The casing 10 may be insulated from ground, as by an insulator 75.

By my invention, means are provided, in a standard or commercial form of instrument, for the successive use of standard plates or charts that may be operated manually or automatically to record a plurality of characteristics, including the time of occurrence, of steep wave-front surges. To the best of my knowledge, no similar device or any means for recording steep-wave front voltage surges has been employed in the engineering field before the device of my invention.

While I have shown and described particular forms of my invention, various modifications and changes may be made without departing from the spirit and scope thereof and I desire that only such limitations shall be placed thereon as are imposed by the prior art or are set forth in the appended claims.

I claim as my invention:

1. In combination with an electric circuit, means for effecting an indication proportional to a voltage surge in the circuit, said surge having a steep wave front, a condenser operatively associated with the circuit and having a potential difference equal to the value of the surge between its ends, and means operatively associated with the condenser across a fractional portion thereof for affecting said means in proportion to the value of the surge.

2. In combination with an electric circuit, means for effecting an indication proportional to a voltage surge in the circuit, said surge having a steep wave front, a multipart insulator constituting a condenser for supporting a conductor of the circuit from ground, and means disposed in the electrostatic field adjacent to the insulator for affecting said means in proportion to the value of the surge.

3. An electrical instrument for measuring surges in an electrical system comprising a condenser, subjected to the normal voltage of the system to set up an electrostatic field proportional to such voltage, a recording element responsive to an electrostatic stress of predetermined value, and means for subjecting said element to a stress, subdivided in the electrostatic field of the condenser, which, under normal conditions, is insufficient to affect the recording element but which is sufficient, under abnormal conditions attending a surge, to influence the recording element.

4. An electrical instrument for measuring the intensity and character of surges in electrical systems comprising a sensitized element responsive to an electrostatic flux stress of predetermined value and means for subjecting such sensitized element to a portion of the electrostatic field of a conductor of the system, such as will, under normal conditions, be of insufficient strength to influence the element but which will be sufficiently amplified, under abnormal conditions incident to a surge, to affect such sensitized element and impress a record of the surge thereon.

5. An electrical instrument for detecting and measuring the intensity and character of surges in an electrical system of high voltage comprising means associated with an element, such as a conductor of the system, for establishing an electrostatic stress field proportional to the voltage on said conductor with respect to ground, an element sensitively responsive to an electrostatic stress of, or greater than, a predetermined value and means disposed in a portion of the field established by the means associated with the conductor for subjecting the responsive element to the electrostatic stress difference in said portion of the field, which normally is less than the value necessary to influence the responsive element but is sufficiently amplified to affect the responsive element under abnormal conditions incident to a surge.

6. An electrical instrument for detecting and measuring the intensity and character of surges in an electrical system of high voltage comprising means associated with the circuit for establishing an electrostatic stress gradient, an element responsive to electrostatic stresses in excess of a predetermined value and means for subjecting said element to a portion of the stress gradient which is insufficient normally to influence the element but is amplified under surge conditions to a strength sufficient to influence the element and impress a record thereon.

7. An electrical instrument for detecting and measuring surges in an electrical system comprising a condenser responsive to the voltage on the system for establishing an electrostatic stress potentiometer, a second condenser for obtaining a sub-divided portion of the established stress, a sensitized stress-responsive element, and a third condenser connected to the second condenser and physically associated with the sensitized element to subject it to the stress derived by the second condenser.

8. The method of detecting and measuring surges in an electrical system which consists in establishing an electrostatic stress gradient proportional to the voltage of the system, and subjecting an electrostatic stress-responsive medium having a critical responsiveness to a subdivided portion of the stress gradient which, at the normal voltage of the system, is below the critical value which will affect the responsive medium but which becomes sufficiently amplified under surge conditions to affect the responsive medium and impress a record thereon characteristic of the surge.

9. The method of detecting and measuring surges in an electrical system, which consists in establishing an electrostatic stress gradient that is a function of the voltage of the system, and subjecting an electrostatic-stress-responsive medium, having a critical responsiveness, to such stress gradient, which, at the normal voltage of the system, is below the critical value which will affect the responsive medium, but which becomes sufficiently amplified under surge conditions to affect the responsive medium and impress a record thereon characteristic of the surge.

In testimony whereof, I have hereunto subscribed my name this 8th day of December, 1923.

JOHN F. PETERS.